United States Patent [19]

Swars

[11] Patent Number: 5,403,559
[45] Date of Patent: Apr. 4, 1995

[54] DEVICE FOR CLEANING EXHAUST GASES OF MOTOR VEHICLES

[75] Inventor: Helmut Swars, Bergisch Gladbach, Germany

[73] Assignee: Emitec Gesellschaft fuer Emissionstechnologie, Lohmar, Germany

[21] Appl. No.: 95,926

[22] Filed: Jul. 22, 1993

Related U.S. Application Data

[63] Continuation of Ser. No. 900,836, Jun. 18, 1992, abandoned, which is a continuation-in-part of Ser. No. 711,564, May 30, 1991, abandoned, which is a continuation of Ser. No. 552,813, Jul. 16, 1990, abandoned.

[30] Foreign Application Priority Data

Jul. 18, 1989 [DE] Germany .................. 8908738 U

[51] Int. Cl.⁶ .................................................. F01N 3/28
[52] U.S. Cl. ............................... 422/180; 422/169; 422/170; 422/171; 422/176; 422/177; 422/174; 60/299; 60/300; 55/DIG. 30; 502/527; 502/439
[58] Field of Search .................. 422/169–171, 422/174–177, 180; 60/299, 300; 502/439, 527; 55/523, 488, DIG. 30

[56] References Cited

U.S. PATENT DOCUMENTS

| | | | |
|---|---|---|---|
| 2,983,495 | 5/1901 | Shuttleworth | 261/112.2 |
| 3,013,781 | 12/1961 | Haselden | 261/112.2 |
| 3,433,044 | 3/1969 | Rhodes et al. | 72/326 |
| 3,716,344 | 2/1973 | Ashburn | 422/180 |
| 3,724,538 | 4/1973 | Yamaguchi et al. | 428/597 |
| 3,830,684 | 8/1974 | Hamon | 261/112.2 |
| 3,839,535 | 10/1974 | Ashburn | 60/298 |
| 3,853,485 | 12/1974 | Hogan | 422/180 |
| 3,948,611 | 4/1976 | Stawsky | 422/180 |
| 3,969,082 | 7/1976 | Cairns et al. | 422/180 |
| 3,998,599 | 12/1976 | Fedor | 422/180 |
| 4,118,199 | 10/1978 | Vöet al. | 422/180 |
| 4,152,302 | 5/1979 | Nonnenmann et al. | 502/527 |
| 4,170,122 | 10/1979 | Cowell | 428/596 |
| 4,277,442 | 7/1981 | Hergart | 422/174 |
| 4,301,039 | 11/1981 | Retallick | 428/597 |
| 4,576,800 | 3/1986 | Retallick | 502/439 |
| 4,604,247 | 8/1986 | Chen et al. | 428/597 |
| 4,647,435 | 3/1987 | Nonnenmann | 502/527 |
| 4,665,051 | 5/1987 | Nonnenmann | 502/439 |
| 4,676,934 | 6/1987 | Sean | 428/597 |
| 4,686,827 | 8/1987 | Wade et al. | 422/174 |
| 4,753,918 | 6/1988 | Cyron | 428/596 |
| 4,987,034 | 1/1991 | Hitachi et al. | 428/597 |
| 5,125,231 | 6/1992 | Patil et al. | 422/171 |

FOREIGN PATENT DOCUMENTS

| | | |
|---|---|---|
| 0130745 | 1/1985 | European Pat. Off. . |
| 0186801 | 7/1986 | European Pat. Off. . |
| 0218417 | 4/1987 | European Pat. Off. . |
| 0270050 | 6/1988 | European Pat. Off. . |
| 3510715 | 10/1986 | Germany . |
| 8530206 | 4/1987 | Germany . |
| 54-25321 | 2/1979 | Japan . |
| 1101638 | 7/1989 | Japan . |
| 315642 | 2/1991 | Japan . |
| 2001547 | 2/1979 | United Kingdom . |
| 294635 | 2/1971 | U.S.S.R. | 261/112.2 |
| 1082470 | 3/1984 | U.S.S.R. | 261/112.2 |

*Primary Examiner*—Robert J. Warden
*Assistant Examiner*—Hien Tran
*Attorney, Agent, or Firm*—Herbert L. Lerner; Laurence A. Greenberg

[57] ABSTRACT

Device for cleaning exhaust gas of a motor vehicle is disclosed. The device comprises a first honeycomb body having a first diameter and a multiplicity of channels through which the exhaust gas can flow, a diffusor disposed downstream of the first honeycomb body as seen in the direction of flow of the exhaust gas, and a second honeycomb body disposed downstream of the diffusor. The second honeycomb body has a second diameter which is greater than the first diameter.

15 Claims, 3 Drawing Sheets

DEVICE FOR CLEANING EXHAUST GASES OF MOTOR VEHICLES

CROSS-REFERENCE TO RELATED APPLICATIONS

This application is a continuation of application Ser. No. 07/900,836, filed Jun. 18, 1992, now abandoned, which is a continuation-in-part of application Ser. No. 711,564, filed May 30, 1991, which was a File Wrapper continuing application of Ser. No. 552,813, filed Jul. 16, 1990.

SPECIFICATION

The invention relates to a honeycomb body assembly, in particular a catalyst body for motor vehicles, including at least partly textured or structured metal sheets disposed in layers and forming walls of a plurality of channels through which a fluid can flow.

Such metal catalyst carrier bodies are known in many variations and are described, for instance, in Published European Application Nos. 0 220 468 A1, corresponding to U.S. Pat. No. 4,818,746; 0 279 159 A1, corresponding to U.S. Pat. No. 4,845,073; 0 245 737 A1, corresponding to U.S. Pat. No. 4,832,998; or 0 245 736 A1.

It has long been known that in most applications and given the usual dimensions of such honeycomb bodies, the flow in the channels is essentially laminar, because very small channel cross sections are used. Under such conditions, relatively thick boundary layers form at the channel walls, which reduce contact of the core flow in the channels with the walls. Processes of diffusion between the core flow and the boundary layer partly balance this out, but still attempts have long been made to gain improvements in that area by means of special structuring of the honeycomb body.

For instance, it is known from German Patent DE-PS 1 192 624, corresponding to U.S. Pat. No. 3,208,131 to make the honeycomb body from a large number of disks that are disposed in succession, and have channels which are offset from one another in the flow direction. A body which is constructed in that way has a succession of new leading edges in the interior thereof, at which the flow is split. Preferably, disks made of spirally wound smooth and corrugated metal sheets are used in succession, with the direction of winding being changed each time. On one hand, such a structure is very expensive from a production standpoint because of the many small disks, and on the other hand it leads to irregular configurations of the channels that are offset from one another, which can be disadvantageous during the coating process and during later operation.

In Published European Application Nos. 0 152 560 A1 and 0 186 801 A2, possibilities for achieving the same concept are described that are more advantageous in production terms, because they do not require the assembly of a honeycomb body from a plurality of disks. However, the undulating forms described therein do mean that considerable proportions of the surface area of the metal sheets contact one another, and as a result the usable area for catalytic contacting is disadvantageous in proportion to the amount of material being used.

In a survey article by M. Nonnenmann, entitled "Neue Metallträger für Abgaskatalysatoren mit erhöhter Aktivität und innerem Strömungsausgleich" [New Metal Carriers for Exhaust Gas Catalysts That Have Increased Activity and Internal Flow Equalization] ATZ Automobiltechnische Zeitschrift [Automobile Industry Journal] 91 (1989), 4, pp. 185–192, describing the advantages and effects of flow channels being offset from one another in the flow direction, a variant is also proposed in which instead of a smooth sheet metal layer, a so-called micro-corrugated strip is used, which makes for somewhat more advantageous utilization of the surface area. However, a micro-corrugation strip along with smooth contacting surfaces forms tiny channels on other structured sheet-metal strips, which become clogged during a subsequent coating operation and thus result in a considerable increase in pressure loss and a further increase in active surface area as well as an unnecessary consumption of coating composition. Nevertheless, the article shows that because of the production options, a metal catalyst carrier body is superior to an extruded ceramic body, because the flow conditions in the interior can be influenced by structural provisions. An additional effect can arise, namely the transverse mixing of flows in the various channels through corresponding connecting paths or openings in the channel walls. However, a purposeful, comprehensive transverse mixing is unattainable with the above-described structures because a pronounced pressure drop that would be necessary for major transverse mixing does not exist. Although the flow is split again and again, it nevertheless does not lead to a purposeful transverse mixing, because the flow courses unite again later. In the case of spirally wound bodies, a transverse mixing from inside to outside is only possible, if at all, through openings in the smooth sheet metal layers, although the resultant effect is extremely slight.

The flow properties on the inside of a catalytic converter have a profound effect on the efficiency and the life span thereof.

The flow velocity in the exhaust gas is relatively low in the cold-starting phase. In this case, the exhaust gas first heats the forward-most disk or partial body of the catalytic converter, until a catalytic reaction starts on those surfaces. However, in higher gas velocities and higher gas temperatures during steady state operation of the engine, the forward part of the honeycomb structure may be damaged.

It is accordingly an object of the invention to provide a catalytic converter, whose structure allows for a quick catalytic response in the cold-starting phase, yet which is not prematurely damaged in its forward, or upstream, region due to the increased operating temperatures.

With the foregoing and other objects in view, there is provided, in accordance with the invention, a device for cleaning exhaust gas of a motor vehicle having an exhaust system with the exhaust gas flowing in a given direction of flow, comprising a first honeycomb body having a first diameter and a multiplicity of channels through which the exhaust gas can flow, a diffusor disposed downstream of the first honeycomb body as seen in the direction of flow, and a second honeycomb body disposed downstream of the diffusor, the second honeycomb body having a second diameter and a multiplicity of channels through which the exhaust gas can flow, the first diameter being smaller than the second diameter.

In accordance with another feature of the invention, a first diffusor for receiving the exhaust gas is disposed upstream of the first honeycomb body as seen in a direction of flow. In this way, the first or cold-starting honeycomb body may have a diameter which is greater than the exhaust pipe leading into the catalytic device.

In accordance with an added feature of the invention, first honeycomb body has a density of channels of approximately 50 to 100 channels per square inch of cross-sectional surface area, and the second honeycomb body has a density of channels of approximately 100 to 200 channels per square inch of cross-sectional surface area.

In accordance with an additional feature of the invention, the device includes means for electrically heating at least one of the first and second honeycomb bodies.

In accordance with a concomitant feature of the invention, the device includes a third honeycomb body having a density of channels of approximately 200 to 400 channels per square inch of cross-sectional surface area, preferably 400 channels.

The flow velocity in the exhaust gas is relatively low in the cold-starting phase. In this case, the exhaust gas first heats the forward-most disk or partial body of the catalytic converter, until a catalytic reaction starts on the surfaces of the forward disk which are coated with catalyst. Due to the small diameter and a relatively small number of channels per cross-sectional area, or channel density, the mass to be heated is small, which further is conducive to quick heating. After the catalytic reaction has set in, the following sections of the catalytic converter are also very quickly brought to the operating temperature. Due to the fact that the cross-section of the first disk is smaller than that of the following disk, the flow velocity through the first disk is greater than that in the subsequently disposed section.

Accordingly, once the cold-starting phase is over and the volume of exhaust gas per unit of time has increased, i.e. the flow velocity has increased, the time it takes for the gas to travel through the forward disk is so short that an essential catalytic reaction no longer takes place in this region. This is the very effect which brings about the specific advantage of the subject matter of this invention.

While the first disk has the effect that the catalytic converter responds very quickly, it hardly participates in the catalytic conversion at a later point, i.e. in the steady state operation, and it remains at a lower temperature than the subsequent disks. Since permanently high temperatures damage the catalytically active material, such damage is largely avoided in the first disk, so that it has a very great lifespan and it retains its proper function in the cold-starting phase during long-term use. In normal operation, the second disk takes over a large share of the catalytic conversion, whereby the second disk has a higher density of channels per unit of cross-sectional area as compared to the first disk. Should the second disk become damaged by the high temperatures in the steady state, then a third disk may be employed to take over this function, possibly with an even higher density of channels per cross-sectional area. Further backup surfaces with catalytically active material may be present in the catalytic converter in the form of further disks.

A configuration with two or several disks of differing cross section disposed behind one another, whereby the first disk has fewer channels per unit of cross-sectional area than the one following it, is very advantageous in terms of flow behavior and it decreases pressure loss in the exhaust system.

In order to obtain a yet faster catalytic response in the catalytic converter, the first disk may be electrically heatable, so that it may be pre-heated even before the engine is started or heated immediately thereafter. It is also very important in this case for the first disk to take part in the catalytic process during higher rpm of the engine only to a limited degree, so that it cannot be damaged by higher temperatures.

It is another object of the invention, to increase the efficiency of and to provide a honeycomb body with internal flow baffles, in particular a catalytic converter body for motor vehicles, which overcomes the hereinafore-mentioned disadvantages of the heretofore-known devices of this general type, in which continuous boundary layers at the channel walls cannot form during the flow of the fluid through them, and in which a purposeful, comprehensive transverse mixing takes place, particularly between the central region and the outer region. Production aspects should also be taken into account in order to maintain a low expenditure for producing such honeycomb bodies. This aspect of the invention and several of the following aspects are described in my co-pending application Ser. No. 711,564.

In accordance with an added feature of the invention, the flow baffles are oriented obliquely outward or obliquely inward with respect to the center axis or center plane of the honeycomb body, or in other words they have a directional component in the radial direction. This is significant because a mixing process occurring transversely to the flow between channels that are located at the same distance from the central region of the honeycomb body is not as advantageous as a process of mixing between the outer, typically colder regions, and the inner, typically warmer central region.

In accordance with an additional feature of the invention, there are provided inner and outer regions, the metal sheets being disposed in a stack and being approximately involutely-shaped and/or S-shaped and/or spiral-shaped at least in the outer region, and the flow baffles are aligned precisely for directing partial flows of fluid along the layers of metal sheets between the inner and outer regions, i.e. from the inside toward the outside, or vice versa.

In accordance with yet another feature of the invention, the metal sheets are alternating layers of smooth sheets and sheets with corrugations having side or flank regions, and the flow baffles and openings are disposed in the side regions.

In accordance with again another feature of the invention, the hydraulic effects of the flow baffles can be added together by the suitable selection of the number, size and direction of these surfaces, in such a way that on average they can divert some of the fluid flowing in the central region of the honeycomb body outward. This provides a very decisive advantage of the present invention. In a honeycomb body, a flow profile typically also forms that is approximately parabolic in cross-section, so that more fluid flows faster in the channels in the central region than in the outer region. However, if most of the flow baffles shift some of the fluid from inner channels into channels located farther outward, then the flow profile can be made more uniform. This increases the catalytic conversion, because the honeycomb body is more uniformly exploited, and diffusion processes are promoted.

In accordance with again an added feature of the invention, there is provided a plurality of axially successive partial bodies or partial regions on average having different characteristics with respect to a distribution of fluid flows. For instance, the first partial body or partial region can be constructed for a uniform distribution of the fluid flows over the entire cross section of the honeycomb body, while ensuing partial bodies or regions can be constructed for uniform mixing of the fluid flows.

In accordance with again an additional feature of the invention, there is provided a central region, the partial bodies or partial regions including a first partial body or partial region, and at least the first partial body or partial region on average directing fluid flows from the central region outward.

In accordance with yet an added feature of the invention, the diffusor is directly connected between the first and second honeycomb bodies.

In accordance with yet a further feature of the invention, the diffusor has a diameter which continuously widens from the first to the second honeycomb body and, in accordance with an additional feature of the invention, the diffusor has a conical cross-section widening in the direction of flow.

In accordance with still feature of the invention, the diffusor has an axial length which is no greater than the length of the either of the first and second honeycomb bodies.

In accordance with an added feature of the invention, the channels are defined by walls of sheet-metal, the channel walls having openings formed therein and flow baffles associated with the openings extending obliquely relative to the channel walls.

In accordance with an additional feature of the invention, the metal sheets are disposed in a stack and are approximately involutely-shaped at least in the outer region, and wherein the flow baffles direct partial flows of fluid along the layers of metal sheets between a radially central region and a radially outer region of the honeycomb body. Additionally, the diffusor is directly connected between the first and second honeycomb bodies.

Wide variety is available in forming the openings and the flow baffles, as described in my afore-mentioned copending application. Such structures can be produced by means of stamping or embossing tools. It has proved to be quite particularly important for the production technique that most of the slits or openings in a smooth strip of metal are deformed in the ensuing corrugation of the strip in such a way that their edge lines do not follow the otherwise corrugated shape of the strip. Without further supplementary provisions, this produces flow baffles having an alignment which can be defined beforehand from the shape and position of the slits or openings. For production reasons, it is therefore preferable to dispose the openings and flow baffles essentially in the side region of the structured sheets, while the smooth sheets are made without openings or at least without flow baffles.

In accordance with a further feature of the invention, at least one of said honeycomb bodies includes radially inner and outer regions and is formed of sheet metal disposed in a stack and being approximately S-shaped, and the flow baffles directing partial flows of fluid along the sheet metal between the inner and outer regions.

In accordance with yet a further feature of the invention, the device includes a plurality of axially successive partial honeycomb bodies or partial regions on average having different characteristics with respect to a distribution of fluid flows and, preferably, a first partial body on average directing fluid flows from the central region outward.

Other features which are considered as characteristic for the invention are set forth in the appended claims.

Although the invention is illustrated and described herein as embodied in device for cleaning exhaust gas of motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
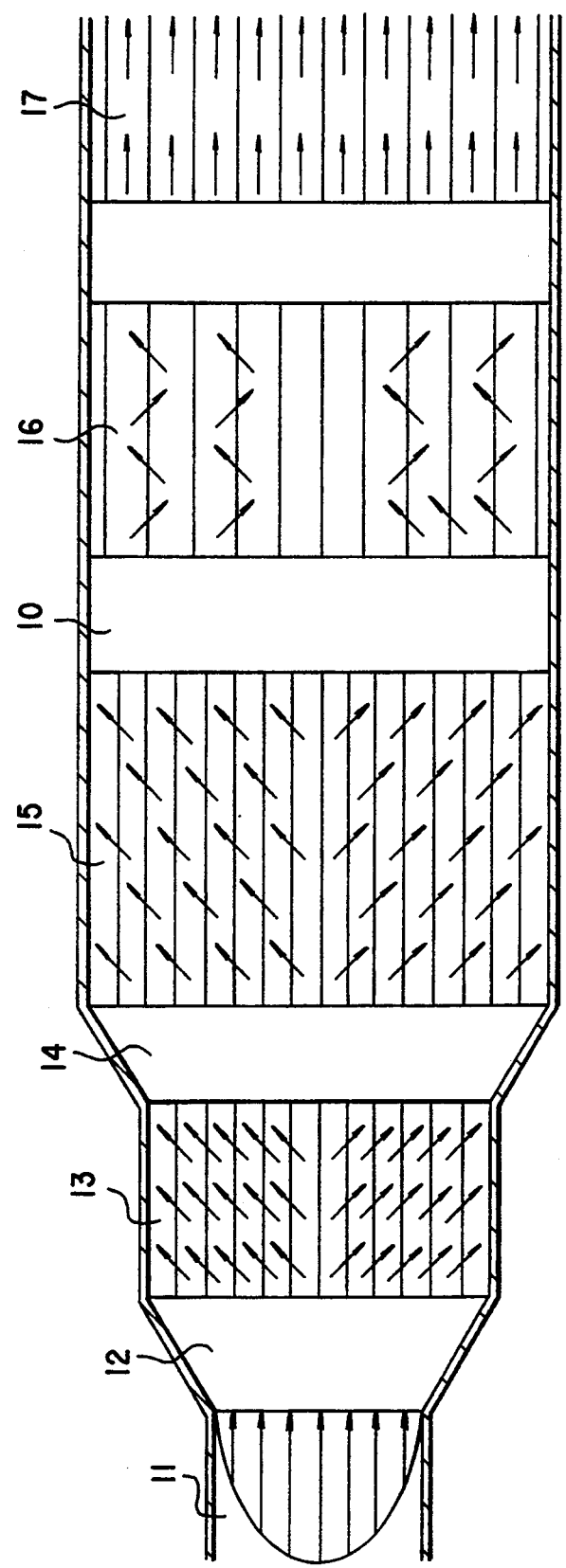
FIG. 1 is a fragmentary, sectional view of a honeycombed exemplary embodiment having partial bodies with different flow characteristics.
Figure 2:
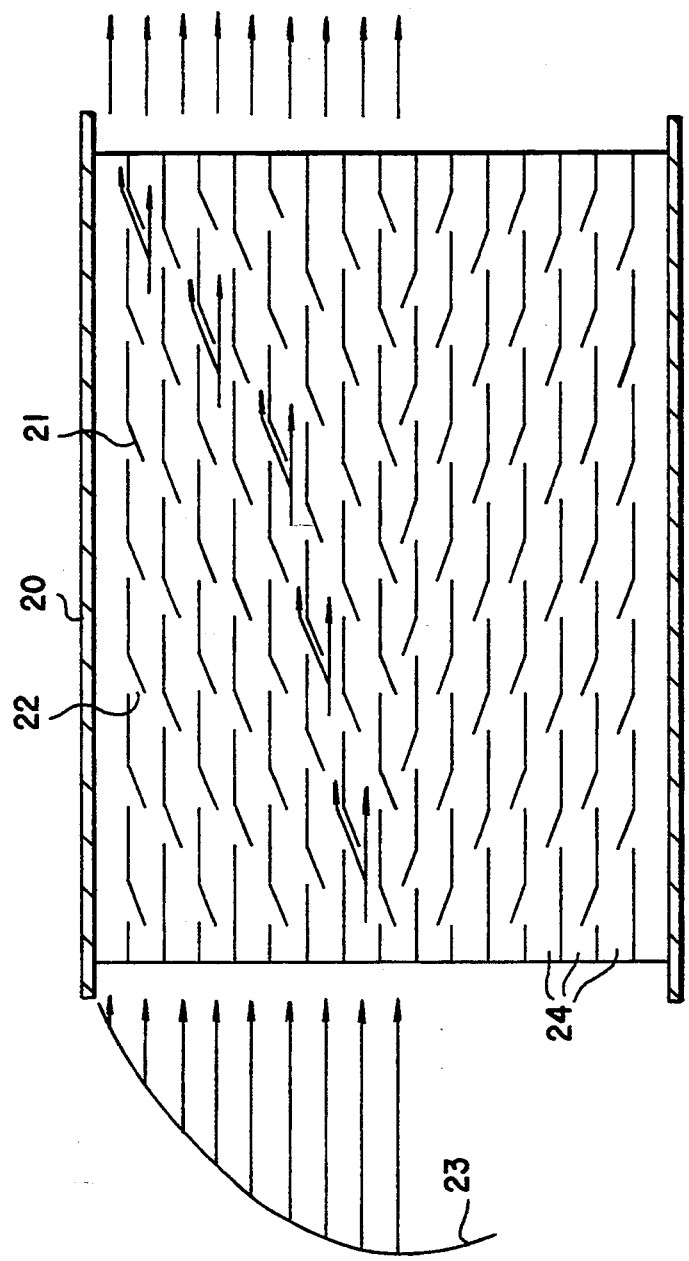
FIG. 2 is a longitudinal, axial-sectional view of a honeycomb body according to the invention, having flow baffles that deflect the flow outward on average.

Referring now to the figures of the drawings in detail and first, particularly, to FIGS. 1 and 2 thereof, there is diagrammatically shown one possible configuration of a series of honeycomb bodies flow baffles 21 and openings 22 in a honeycomb body that is surrounded by a jacket tube 20. The honeycomb body is generally encountered by a flow having a parabolic profile 23 entering channels 24. The distribution of flow baffles 21, diagrammatically suggested in the longitudinal axial section, provides an evening out of the flow profile, because partial flows are repeatedly deflected out of the channels 24 having a high volumetric flow into farther outward adjacent channels 24 having a lower volumetric flow.

Figure 3:
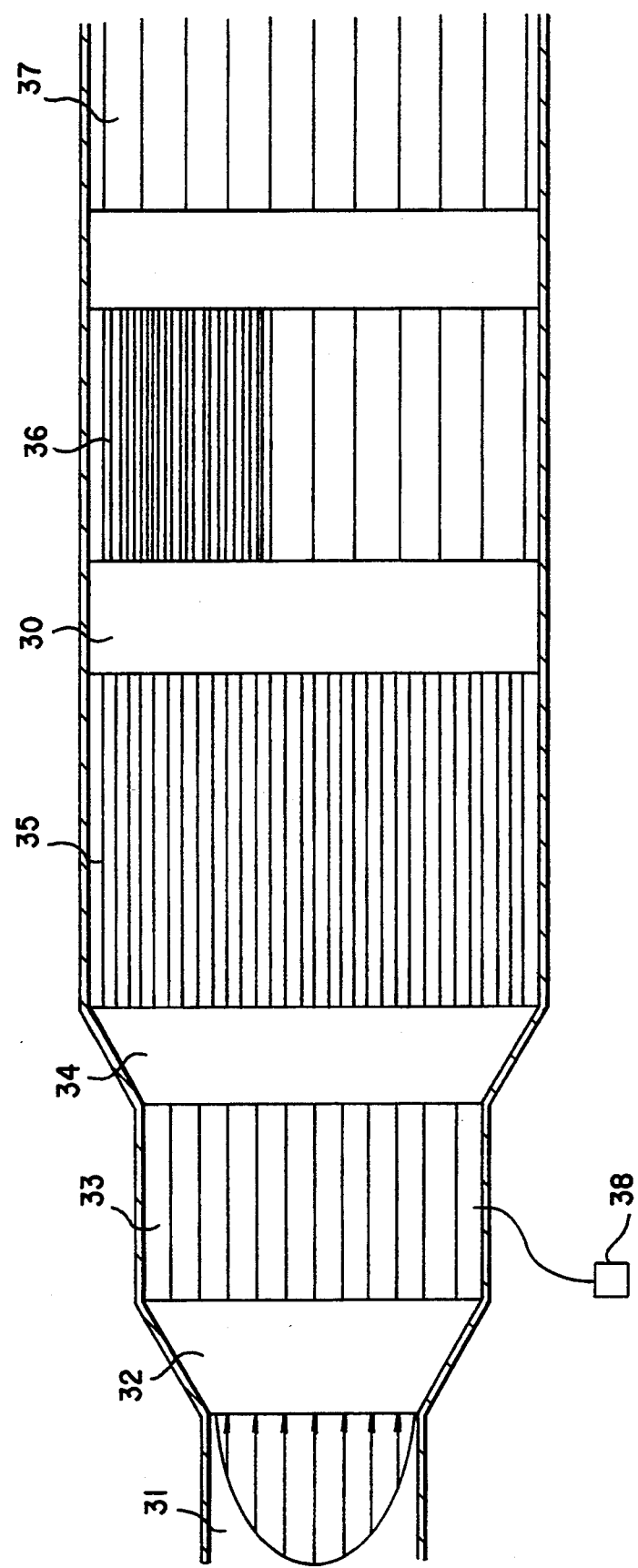
FIG. 3 is a view similar to FIG. 1, with partial honeycomb bodies which do not include flow baffles, but with differing distribution of flow channel density.

A configuration as shown in FIG. 1 can be quite advantageous with respect to the flow properties. An exhaust pipe 11 merges through a diffuser 12 into a first partial body 13, which effects a predistribution and pre-evening out of the flow. This is followed by a second diffuser 14, which is followed by a second partial body 15 having a flow guidance characteristic that is oriented substantially outward. This configuration has a very low pressure loss, and in the bodies 13 and 15 the pressure loss may even be negative. Further partial bodies 16 and 17 for mixing or as reserve surface areas which are disposed in a common jacket tube 10, can follow. As explained above, it is advantageous for the successive partial bodies to have different numbers of cells per unit of surface area. With reference to FIG. 3, for instance, the first honeycomb body 33 may have a cell count of 50 or 100 cpi (cells per square inch), while the second partial body 35 may have 100 or 200 cpi, the third partial body 36 may have 200 cpi, and the partial body 37 serving to provide the reserve surface area may have 400 cpi.

FIGS. 1 and 3 illustrate the great number of possibilities in terms of systems technology that are offered by the configuration of honeycomb bodies according to the invention.

As shown in FIG. 3, an exhaust pipe 31 merges through a diffuser 32 into a first partial body or honeycomb disk 33. This is followed by a second diffuser 34, which is followed by a second partial body or disk 35. As indicated, the second disk 35 has a higher density of flow channels than the disk 33. This configuration has a very low pressure loss, and in the bodies 33 and 35 the pressure loss may even be negative. Further partial bodies 36 and 37 may be disposed in a common jacket tube 30.

FIG. 3 clearly shows the increasing density of flow channels from disk 33 to 35 to 36. The densities correspond to those indicated for the partial bodies 13, 15 and 16 in FIG. 1. The velocity vector diagram of the exhaust gas is shown at the inlet pipe of the honeycomb body assembly at 33. The diffusors 32 and 34 do not require flow guide surfaces, as the exhaust gas will be automatically sufficiently distributed over the cross-section.

Although the honeycomb bodies according to the invention have been primarily explained in terms of their advantages when used as catalyst carrier bodies, their use is not restricted thereto. It should be noted that honeycomb bodies according to the invention may also be used for catalysts that are directly heatable electrically. Means 38 for electrically heating the first partial body 33 of the catalytic converter are indicated in FIG. 3. The honeycomb bodies 35 and 36, or 13, 15 and 16, may also be electrically heated.

I claim:

1. Device for catalytically cleaning exhaust gas of a motor vehicle having an exhaust system with the exhaust gas flowing in a given direction of flow, comprising a housing, a first catalyst carrier body disposed in said housing and having a first diameter and a multiplicity of channels extending in a direction of flow for guiding an exhaust gas, a diffusor disposed downstream of said first catalyst carrier body as seen in the direction of flow, and a second catalyst carrier body disposed in said housing downstream of said diffusor as seen in the direction of flow, said second catalyst carrier body having a second diameter and a multiplicity of channels extending in the direction of flow for guiding the exhaust gas, said first diameter being smaller than said second diameter, and each of said first and second catalyst carrier bodies carrying catalytically active material for catalytically cleaning the exhaust gas, said diffusor being connected substantially directly between said first and second catalyst carrier bodies.

2. Device according to claim 1, wherein said diffusor is a second diffusor, and the device further including a first diffusor for receiving the exhaust gas disposed upstream of and connected to said first catalyst carrier body as seen in the direction of flow.

3. Device according to claim 1, wherein said first catalyst carrier body has a density of channels of approximately 50 to 100 channels per square inch of cross-sectional surface area.

4. Device according to claim 1, wherein said second catalyst carrier body has a density of channels of approximately 100 to 200 channels per square inch of cross-sectional surface area.

5. Device according to claim 1, including means disposed inside said housing for electrically heating at least one of said first and second catalyst carrier bodies.

6. Device according to claim 1, including a third catalyst carrier body disposed downstream of said second catalyst carrier body, said third catalyst carrier body having a density of channels of approximately 200 to 400 channels per square inch of cross-sectional surface area.

7. Device according to claim 6, wherein said third catalyst body has a channel density of approximately 400 channels per square inch.

8. Device according to claim 1, wherein said first and second catalyst carrier bodies are metal carrier bodies.

9. Device according to claim 1, wherein said diffusor has a third diameter continuously widening from said first to said second diameters.

10. Device according to claim 1, wherein said diffusor has a conical cross-section widening in the direction of flow.

11. Device according to claim 1, wherein each of said diffusor and first and second catalyst carrier bodies has a different axial length, said axial length of said diffusor being no greater than the smaller of said axial lengths of said first and second catalyst carrier bodies.

12. Device according to claim 1, wherein at least one of said catalyst carrier bodies are formed of sheet-metal layers forming said channels, said channels having walls with openings formed therein and flow baffles associated with said openings extending obliquely relative to said channel walls.

13. Device according to claim 12, Wherein said diffusor has a third diameter continuously widening from said first to said second diameters.

14. Device according to claim 12, wherein said diffusor has a conical cross-section widening in the direction of flow.

15. Device according to claim 12, wherein each of said diffusor and first and second catalyst carrier bodies have an axial length, said length of said diffusor being no greater than the smaller of said lengths of said first and second catalyst carrier bodies.

* * * * *